United States Patent
Trevisan (10) Patent No.: US 12,054,282 B2
(45) Date of Patent: Aug. 6, 2024

(54) LANDING GEAR LOAD DETECTION SYSTEM

(71) Applicant: Safran Landing Systems Canada Inc., Ajax (CA)

(72) Inventor: Ross Trevisan, Oakville (CA)

(73) Assignee: Safran Landing Systems Canada Inc., Ajax (CA)

( * ) Notice: Subject to any disclaimer, the term of this patent is extended or adjusted under 35 U.S.C. 154(b) by 67 days.

(21) Appl. No.: 17/751,027

(22) Filed: May 23, 2022

(65) Prior Publication Data

US 2023/0373650 A1    Nov. 23, 2023

(51) Int. Cl.
| | | |
|---|---|---|
| *B64C 25/32* | (2006.01) | |
| *B64C 25/34* | (2006.01) | |
| *B64C 25/58* | (2006.01) | |
| *B64D 45/00* | (2006.01) | |
| *G01L 5/00* | (2006.01) | |

(52) U.S. Cl.
CPC .............. *B64D 45/00* (2013.01); *B64C 25/34* (2013.01); *B64C 25/58* (2013.01); *G01L 5/00* (2013.01); *B64D 2045/007* (2013.01)

(58) Field of Classification Search
CPC .................. B64C 25/68; B64C 25/426; B64C 2025/006; B64C 25/66; B64C 2025/325; B64D 2045/008; B64D 45/0005; B64F 5/60

See application file for complete search history.

(56) References Cited

U.S. PATENT DOCUMENTS

| | | | | |
|---|---|---|---|---|
| 2,677,516 A | | 5/1954 | Pilling | |
| 3,045,958 A | * | 7/1962 | Mackie | B64C 25/68 244/110 G |
| 3,129,903 A | * | 4/1964 | Dewar | B64C 25/426 244/111 |
| 3,680,885 A | * | 8/1972 | DeCardi | B64C 25/32 291/1 |
| 4,267,987 A | * | 5/1981 | McDonnell | B64D 39/00 244/6 |
| 4,278,219 A | * | 7/1981 | Finance | G01P 15/036 244/129.1 |

(Continued)

OTHER PUBLICATIONS

International Search Report and Written Opinion mailed Jul. 16, 2023, issued in corresponding International Application No. PCT/CA2023/050697, filed May 19, 2023, 8 pages.

*Primary Examiner* — Tran M. Tran
(74) *Attorney, Agent, or Firm* — CHRISTENSEN O'CONNOR JOHNSON KINDNESS PLLC (57) ABSTRACT

A load detection system detects loads applied to a landing gear assembly during landing. The landing gear assembly includes an axle coupled to a piston rod of a compressible shock strut and a wheel rotatably mounted the axle. A torque link includes a lower link coupled to the piston rod of the shock strut so that compression of the shock strut rotates the link about a first axis. The load detection system includes a probe rotatably coupled about a second axis. The probe engages a ground surface when the shock strut is uncompressed and the wheel contacts the ground surface. The lower link rotates the probe as the shock strut compresses. A sensor senses a position of the probe, which corresponds to a load on the wheel when the shock strut is uncompressed and the wheel is in contact with the ground surface.

14 Claims, 11 Drawing Sheets

(56) References Cited

U.S. PATENT DOCUMENTS

| | | | | |
|---|---|---|---|---|
| 5,366,181 | A * | 11/1994 | Hansen | B64G 1/62 |
| | | | | 244/100 R |
| 5,801,301 | A * | 9/1998 | Jeong | G01M 17/007 |
| | | | | 340/463 |
| 6,237,407 | B1 * | 5/2001 | Nance | G01M 1/125 |
| | | | | 73/178 T |
| 7,028,949 | B2 * | 4/2006 | Muylaert | B64C 25/00 |
| | | | | 244/116 |
| 7,439,852 | B1 * | 10/2008 | Pledger | B60C 23/08 |
| | | | | 73/146 |
| 8,042,765 | B1 * | 10/2011 | Nance | B64D 45/0005 |
| | | | | 244/100 R |
| 8,079,548 | B2 * | 12/2011 | Luce | B64C 25/00 |
| | | | | 244/103 W |
| 8,226,030 | B2 * | 7/2012 | Mast | B64C 25/52 |
| | | | | 244/108 |
| 8,490,919 | B2 * | 7/2013 | Nannoni | B64C 25/14 |
| | | | | 244/108 |
| 8,714,480 | B2 * | 5/2014 | Prud'Homme-Lacroix | |
| | | | | B64C 25/52 |
| | | | | 244/102 R |
| 8,752,785 | B2 * | 6/2014 | Wilson | B64C 25/14 |
| | | | | 244/102 R |
| 8,800,919 | B2 * | 8/2014 | Ferrier | B64C 27/006 |
| | | | | 244/100 A |
| 9,008,871 | B2 * | 4/2015 | Jones | G07C 5/008 |
| | | | | 701/16 |
| 9,033,276 | B1 * | 5/2015 | Calvert | B64C 25/10 |
| | | | | 244/102 R |
| 9,045,236 | B2 * | 6/2015 | Botargues | G01M 17/04 |
| 9,169,031 | B2 * | 10/2015 | Låks | B64F 1/16 |
| 9,891,122 | B2 * | 2/2018 | Schwartz | F16H 25/2021 |
| 10,131,419 | B2 * | 11/2018 | Baird | B64C 25/00 |
| 10,370,091 | B2 * | 8/2019 | Lacy | B64C 25/001 |
| 10,464,690 | B2 * | 11/2019 | Vinson | B64F 5/60 |
| 10,479,527 | B2 * | 11/2019 | Bistuer | B64C 25/32 |
| 10,669,017 | B2 * | 6/2020 | Simpson | B64C 25/22 |
| 10,850,834 | B2 * | 12/2020 | Duval | B64C 25/66 |
| 10,906,352 | B2 * | 2/2021 | Hein | B60B 15/22 |
| 10,933,983 | B2 | 3/2021 | Dubrovsky et al. | |
| 11,059,571 | B2 * | 7/2021 | Schmidt | B64C 25/001 |
| 11,091,250 | B2 * | 8/2021 | Hilliard | F15B 15/1471 |
| 11,091,252 | B2 * | 8/2021 | Ning | B64C 25/60 |
| 11,104,450 | B2 * | 8/2021 | Stein | F16F 9/3264 |
| 11,136,113 | B2 * | 10/2021 | Cottet | B64C 25/12 |
| 11,332,238 | B2 * | 5/2022 | Tischhauser | B64C 25/60 |
| 11,414,181 | B2 * | 8/2022 | Price | B64C 25/26 |
| 11,440,647 | B2 * | 9/2022 | Berenbaum | B64C 25/001 |
| 11,685,520 | B2 * | 6/2023 | Himmelmann | B64C 25/10 |
| | | | | 244/100 R |
| 2005/0279885 | A1 * | 12/2005 | Tebon | B64C 25/00 |
| | | | | 244/100 R |
| 2008/0033607 | A1 * | 2/2008 | Zeliff | B64D 45/0005 |
| | | | | 701/31.4 |
| 2009/0056431 | A1 * | 3/2009 | Jones | G01M 17/04 |
| | | | | 73/118.03 |
| 2010/0252678 | A1 | 10/2010 | Luce | |
| 2013/0240664 | A1 * | 9/2013 | Cox | G01B 11/14 |
| | | | | 356/28 |
| 2014/0318265 | A1 * | 10/2014 | Gengler | G01N 3/00 |
| | | | | 73/788 |
| 2016/0023750 | A1 | 1/2016 | Thompson | |
| 2019/0344904 | A1 * | 11/2019 | Stein | B64D 45/0005 |
| 2021/0283970 | A1 * | 9/2021 | Moriarty | B60G 15/062 |
| 2023/0095261 | A1 * | 3/2023 | Wilson | B64C 25/34 |
| | | | | 244/102 SL |
| 2023/0192275 | A1 * | 6/2023 | Koane-Yane | B64C 25/10 |
| | | | | 244/102 R |

* cited by examiner

LANDING GEAR LOAD DETECTION SYSTEM

BACKGROUND

Landing gear configurations, including wheeled landing gear for rotorcraft or rotary-wing aircraft, are known to utilize systems to measure loads applied to the landing gear, particularly during landing. These systems typically detect relative movement or deflection of landing gear components during landing. For example, for a landing gear configuration that includes a shock strut and a torque link, a load measurement system, may sense compression of the shock strut and/or the corresponding movement of the torque link to determine the applied load. An example of an aircraft landing gear having a shock strut in combination with a torque link is disclosed by U.S. Pat. No. 10,933,983, which is currently assigned to Safran Landing Systems Canada Inc., the disclosure of which is incorporated by reference herein.

During a landing sequence, loads applied to the landing gear are initially low and increase as more of the aircraft weight is supported by the landing gear. For a given landing gear, the load required to compress the shock strut can be quite high to cause this relative movement and/or deflections is referred to as a "break-out load." Until the break-out load is reached, the shock strut does not compress, however, more flexible components of the landing gear, such as the tires, will deflect when subjected to loads less than the break-out load.

The break-out loads for different landing gear can be quite large, and the ability of known load detection systems to measure landing gear loads is generally limited to loads greater than or equal to the break-out load. However, it can be desirable to determine landing gear loads that are less than the break-out load for a particular landing gear. Further, it is important that load detection systems be durable and not add undue maintenance costs.

SUMMARY

The present disclosure provides examples of a load detection system for an aircraft landing gear assembly. In an embodiment, the landing gear assembly includes an axle coupled to a piston rod of a compressible shock strut. A wheel is rotatably mounted to the axle, and a torque link includes a lower link rotatably associated with the axle. Compression of the shock strut rotates the link about a first axis. In an embodiment, the load detection system comprises an elongate probe rotatably coupled about a second axis and configured to engage a ground surface when the shock strut is in an uncompressed state and the wheel is in contact with the ground surface. The lower link rotates the probe as the shock strut moves from the uncompressed state to a compressed state. The load detection system further comprises a sensor configured to sense a position of the probe. The sensed position of the probe corresponds to a load on the wheel when the shock strut is uncompressed and the wheel is in contact with the ground surface.

In any embodiment, rotation of the probe by the lower link disengages the probe from the ground surface.

In any embodiment, the load detection system further comprises a target mounted to the probe, the sensor being fixedly positioned relative to the axle and configured to sense the target.

In any embodiment, the sensor senses a position of the target.

In any embodiment, the sensor senses a movement of the target through a predetermined position.

In any embodiment, the sensor is a rotational variable differential transformer configured to sense an angular position of the probe In any embodiment, the load detection system further comprises a mounting fitting coupled to the axle; and a pivot fitting rotatably coupling the probe to the mounting fitting.

In any embodiment, the pivot fitting is fixed in rotation relative to the probe about the second axis.

In any embodiment, the lower link comprises a link engagement feature that contacts a pivot fitting engagement feature as the shock strut moves from the uncompressed state to a compressed state In any embodiment, at least one of the link engagement feature and the pivot fitting engagement feature formed on the link and the pivot fitting, respectively.

In any embodiment, the sensor is configured to send signals corresponding to a sensed probe position to a controller, the controller being programmed to determine a load applied to the landing gear according to signals received from the sensor.

In any embodiment, the probe rotates in response to deflection of the wheel when the shock strut is uncompressed.

In any embodiment, the probe comprises a pad that contacts the ground surface

In any embodiment, a position of the pad relative to the second axis is selectively adjustable.

In any embodiment, a rotocraft comprises a disclosed load detection system.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Figure 1:
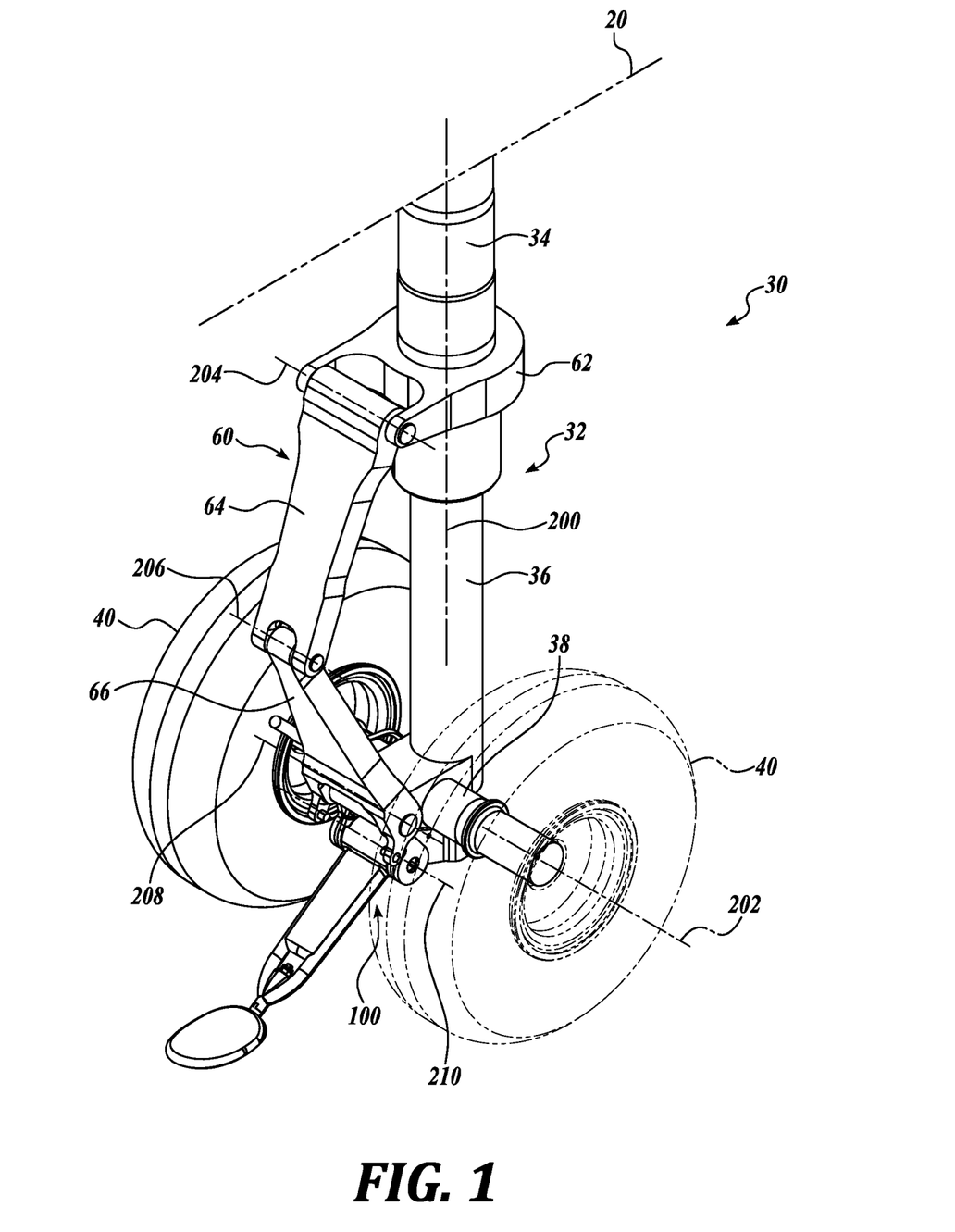
FIG. 1 shows an isometric view of a landing gear assembly with a load sensor in accordance with an embodiment of the present disclosure.

FIG. 1 shows an isometric view of a landing gear 30 with a shock strut 32, torque link assembly 60, and load detection system 100 according to an embodiment of the present disclosure. In the illustrated embodiment, the landing gear 30 is used in conjunction with an aircraft 20, such as Vertical Takeoff and Landing (VTOL) aircraft, e.g., helicopters, and Horizontal and Vertical Takeoff and Landing (HVTOL) aircraft, e.g., helicopters capable of both horizontal take-off. However, embodiments are contemplated for use with other vehicles, such as maglev vehicles or any other vehicle that utilizes shock strut/torque link combinations.

The landing gear 30 includes one or more wheels 40 rotatably mounted to an axle assembly 38. The axle assembly 38 is coupled to one end of the shock strut 22, which is coupled at the other end to the aircraft 20. The landing gear 30 extends down from the aircraft 20 and contacts to the ground to support the aircraft when the aircraft is not airborne. The wheels 40 enable the aircraft to be maneuvered on the tarmac under its own power or by a tow vehicle. It will be appreciated that the present disclosure is not limited to the illustrated landing gear assembly, but can include any landing gear assembly that utilizes a shock strut, including those with different numbers of wheels, support carriages, deployment mechanisms, etc.

The shock strut 32 includes a piston rod 36 that telescopically engages a cylinder 34. The shock strut 32 is configured to cushion impacts (for example during landings) in a conventional manner, typically compressing a gas (for example nitrogen or air) contained in the shock strut 32 and dissipating the compression energy by performing work on an incompressible fluid (for example hydraulic fluid), also contained in the shock strut 32.

The torque link assembly 60 engages both an alignment feature 62 and the piston rod 36 (directly or indirectly) to maintain the rotational position of the piston rod 36 (about the longitudinal axis 200 of the cylinder 34/piston rod 36) relative to the alignment feature 62. In the disclosed embodiment, the alignment feature 62 is a steering collar that extends circumferentially around the exterior surface of the cylinder 34. In some embodiments, the steering collar is selectively rotatable about the longitudinal axis 200 of the cylinder 34. In some embodiments, the alignment feature 62 is fixed in rotation about the axis 200 of the cylinder 34.

The torque link assembly 60 includes an upper link 64 and a lower link 66. One end of the upper link 64 is rotatably coupled about an axis 204 to the alignment feature 62. The other end of the upper link 64 is rotatably coupled to an end of the lower link 66 about an axis 208. The other end of the lower link 66 is rotatably coupled about an axis 206 to the axle assembly 38. The axes 204, 206, and 208 are parallel accommodates longitudinal movement of the piston rod 36 within the cylinder 34 while maintaining rotational position of the axle assembly 38 relative to the collar 62.

Figure 2:
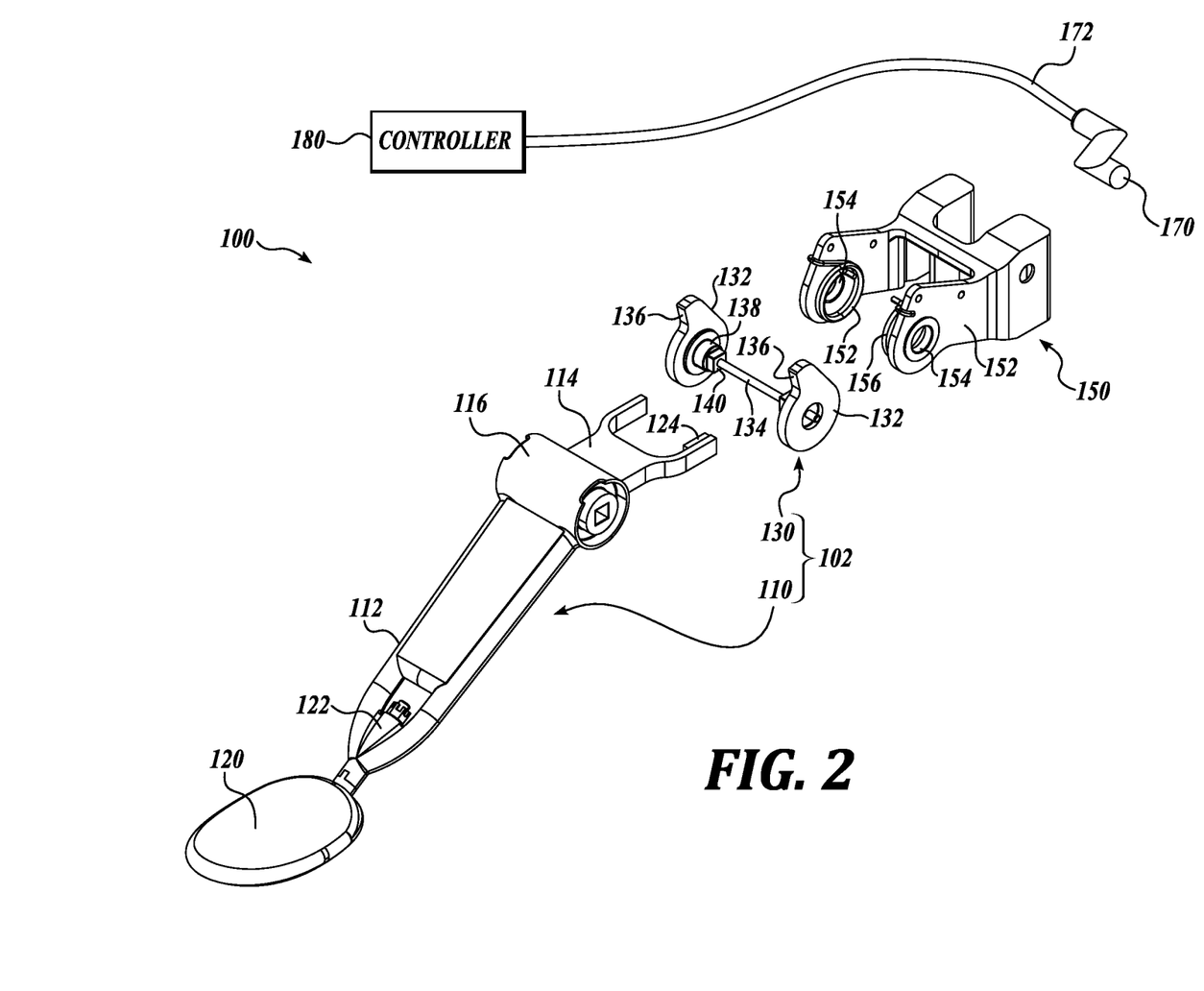
FIG. 2 shows a partially exploded isometric view of the load sensor of FIG. 1.
Figure 3:
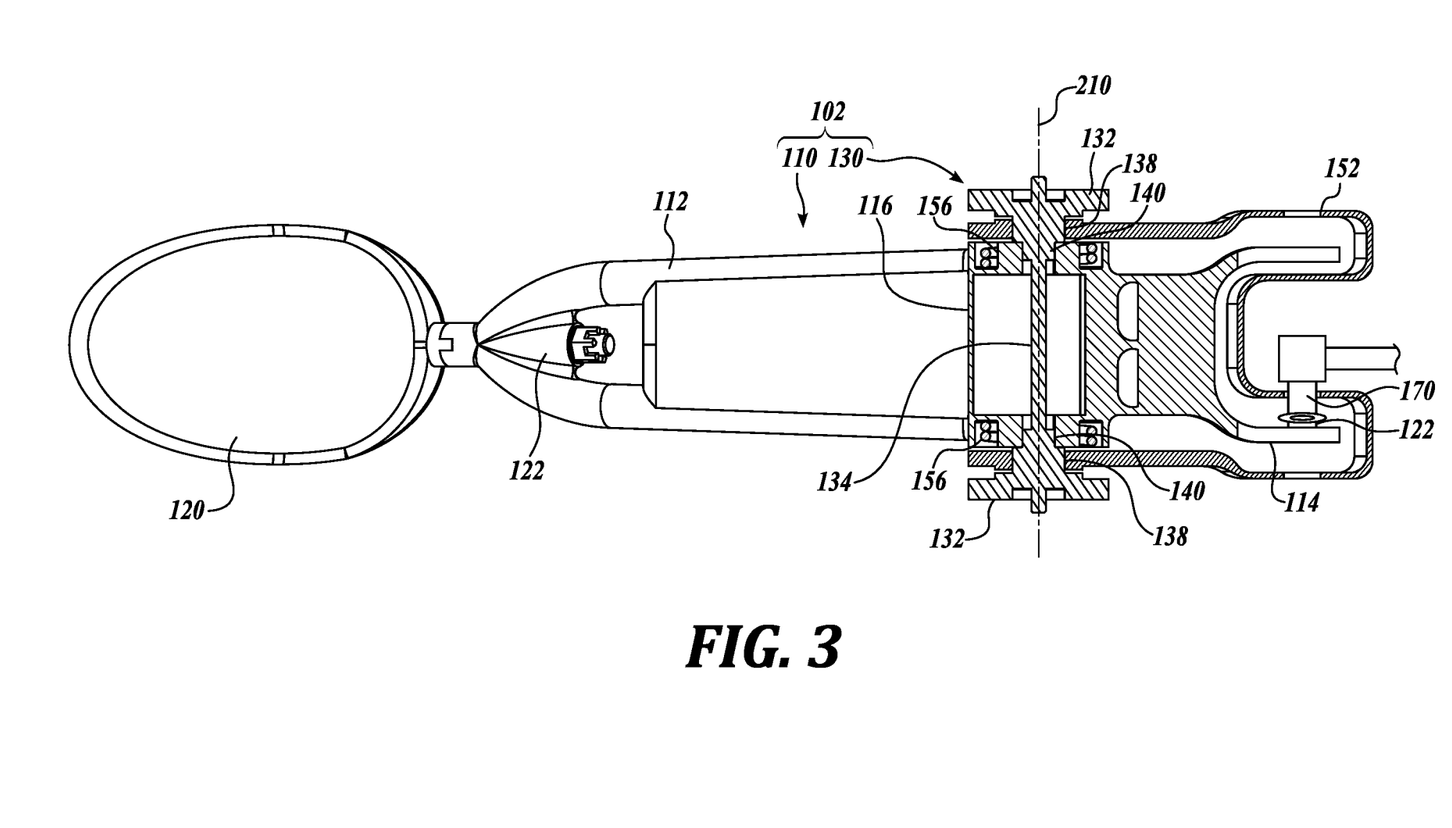
FIG. 3 shows a partial cross-sectional view of the load sensor of FIG. 1 as indicated in FIG. 4.

Referring now to FIGS. 2 and 3, the load detection system 100 will be described in some detail. In the embodiment shown, the load detection system 100 includes a probe 110 rotatably mounted about an axis 210 to a mounting fitting 150 by a pivot fitting 130. The probe 110 includes a probe arm 112 extending in a first direction from a center portion 116 and a target arm 114 extending from the center portion 116 in a second direction.

The probe arm 112 is an elongate arm fixedly associated with the center portion 116 at a first end having a pad 120 mounted to a second end. The pad 120 is configured to contact the ground during a landing sequence and preferably is formed from or includes a bearing material. In some embodiments, the bearing material is an acetal homopolymer or any other material having suitable durability, stiffness, and dimensional stability. In an embodiment, the pad 120 is mounted to the probe arm 112 with an adjustment feature 122 that provides for selective adjustment of the location of the pad 120 relative to the probe arm 112. In the illustrated embodiment, the adjustment feature 122 includes a threaded rod extending from the pad 120 and secured with a jam nut. Thus, the adjustment feature 122 provides for selective positioning of the pad 120 relative to the probe arm, and more specifically, to the axis 210 of rotation of the probe 110.

The target arm 114 is fixedly associated with the center portion 116. In the illustrated embodiment the target arm 114 has a fork-shaped profile with two parallel arms extending radially from the center portion 116. A target 124 is mounted to the interior side of one of the parallel arms. As will be described in further detail, the position of the target 124 is sensed by a sensor to determine a load on the landing gear 30.

The center portion 116 includes an aperture extending therethrough. A square recess 118 is formed at each end of the aperture. The aperture and square recesses 118 are sized and configured to cooperate with a pivot fitting 130 to rotatably couple the pivot fitting 130 about axis 210 to the mounting fitting 150.

Still referring to FIGS. 2 and 3, the pivot fitting 130 includes a pair of end fittings 132 fixedly mounted to opposite ends of a pin 134. Each end fitting 132 has a generally circular profile with an engagement feature 136, such as a lobe, extending radially therefrom. The engagement features 136 of the end fittings 132 are aligned with each other. A cylindrical boss 138 is disposed adjacent to the interior side of each end fitting 132 and is coaxial with the pin 134. A square boss 140 positioned adjacent to the interior side of each cylindrical boss 138.

The mounting fitting 150 is mounted to or otherwise fixedly positioned relative to the axle assembly 38. In the illustrated embodiment, the mounting fitting includes a housing 152 sized and configured to receive at least a portion of the target arm 114 of the probe 110. The housing 152 includes a pair of parallel lugs spaced apart to receive the center portion 116 of the probe 110 therebetween. A pair of coaxial apertures 154 are formed in the lugs and each aperture is sized and configured to receive one of the cylindrical bosses 138 of the pivot fitting 130.

As best shown in FIG. 3, the probe 110 is rotatably mounted to the mounting fitting 150 by the pivot fitting 130. Each cylindrical boss 138 of the pivot fitting 130 is disposed within one of the coaxial apertures 154 of the housing 152 so that the pivot fitting 130 is rotatable relative to the housing 152 about axis 210. In some embodiments, each coaxial aperture 154 include a bushing mounted therein to decrease friction and/or wear of the housing 152 and the pivot fitting 130.

Each square boss 140 of the pivot fitting 130 is received within one of the square recesses 118 of the center portion 116 of the probe 110. Thus, the probe 110 and the pivot fitting 130 are fixed in rotation relative to each other about axis 210 and are also rotatable about axis 210 relative to the housing 152. It will be appreciated that the square bosses 140 and square recesses 118 are exemplary only. In some embodiments, the probe 110 and pivot fitting 130 are fixed in rotation relative to each other by a keyed engagement having any suitable shape. In some embodiments, the engagement features 136 are integrally formed on the probe arm 112 or any other suitable component so that the features 136 rotate with the probe 110 about axis 210.

Still referring to FIG. 3, the target arm 114 is nested within the housing 152. One or more biasing elements 156 engage the housing 152 and at least one of the probe 110 and the pivot fitting 130 to apply a biasing force that tends to rotate the probe assembly 102 about axis 210 so that the pad 120 moves downward, i.e., toward the ground (counter-clockwise as shown in FIGS. 4-11). In some embodiments, one or more of the biasing elements 156 is a torsion spring. In some embodiments, one or more of the biasing elements 156 is a compression spring, a tension spring, or any other suitable biasing element.

A stop, not shown, limits the rotation of the probe 110 toward the ground. In some embodiments, the target arm 114 engages a portion of the housing 152 to act as a stop. In some embodiments, any suitable configuration can be included to limit rotation of the probe 110 toward the ground. The biasing elements 156 and stop cooperate to maintain the probe 110 in a predetermined initial position, i.e., "default position," shown in FIGS. 4 and 8, unless acted on by external forces.

A sensor 170 is mounted to the housing 152 of the mounting fitting 150. The sensor 170 is positioned proximate to the target 124 mounted to the target arm 114. As will be described in further detail, the sensor 170 senses the position and/or movement of the target 124 as the target arm 114 rotates about axis 210 during a landing event. The sensor 170 is in operable communication with a controller 180 by a hardwire connection 172, wireless communication, or any other suitable means. The sensor 170 send signals corresponding to the sensed position and/or movement of the target 124 to the controller 180.

The controller 180 is programmed to receive signals from the sensor 170 and determine that a predetermined load has been applied to the landing gear 30 according to the signals received from the sensor 170. In some embodiments, the controller 180 determines the load by comparing a received signal to a value in a lookup table that includes loads corresponding to various signal values. In some embodiments, the controller is programmed to calculate the load based on the received signal and known landing gear characteristics, such as the spring rate of the wheels 40, the geometry of the probe 110, etc. In some embodiments, the controller is programmed to determine a load from a signal according to any suitable method.

In some embodiments, the controller 180 is programmed provide feedback when a signal corresponding to the predetermined load is received from the sensor 170. In some embodiments, the feedback is visual or audio signal to the pilot, haptic feedback, or any other suitable feedback indicating that the target load has been achieved prior to the break-out load.

In some embodiments, the controller 180 is a discrete controller. In some embodiments, the described functions of the controller 180 are performed by one or more other control units, controllers, the flight control computers (FCCs) etc., of the aircraft. In some embodiments, the discrete controller and/or the one or more other control units comprise hardware circuitry (e.g., analog and/or digital circuits, etc.) for carrying out its functionality described herein. In other embodiments, the controller or the various control units include, for example, a processor and memory. The memory may include computer readable storage media in read-only memory (ROM), random-access memory (RAM), and keep-alive memory (KAM), for example. The KAM may be used to store various operating variables or program instructions while the processor is powered down. The program instructions, when executed by the processor, is configured to carry out the functionality of the controller 180 described above. In that regard, the processor and/or memory storing the program instructions forms a special purpose controller or control circuit specifically configured to carry out the methodologies and technologies described herein.

The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, instructions, programs, modules, etc.

As used herein, the term processor is not limited to integrated circuits referred to in the art as a computer, but broadly refers to a microcontroller, a microcomputer, a microprocessor, a programmable logic controller, an application specific integrated circuit, other programmable circuits, combinations of the above, among others. Therefore, as used herein, the term "processor" can be used to generally describe these aforementioned components, and can be either hardware or software, or combinations thereof, that implement logic for carrying out various aspects of the present disclosure. Similarly, the terms "module" and "unit" can include logic that may be implemented in either hardware or software, or combinations thereof.

Referring now to FIGS. 4-11, operation of the load detection system 100 will be described. FIGS. 4-7 show the landing gear 30 in various positions experienced during an aircraft 20 landing. FIGS. 8-11 show an enlarged side view of the load detection system 100 with the mounting fitting 150 removed for clarity. The positions of the load detection system 100 shown in FIGS. 8-11 correspond to the positions of the landing gear 30 shown in FIGS. 4-7, respectively. For example, when the landing gear 30 is in the position shown in FIG. 6, the load detection system 100 is in the position shown in FIG. 10.

Figure 4:
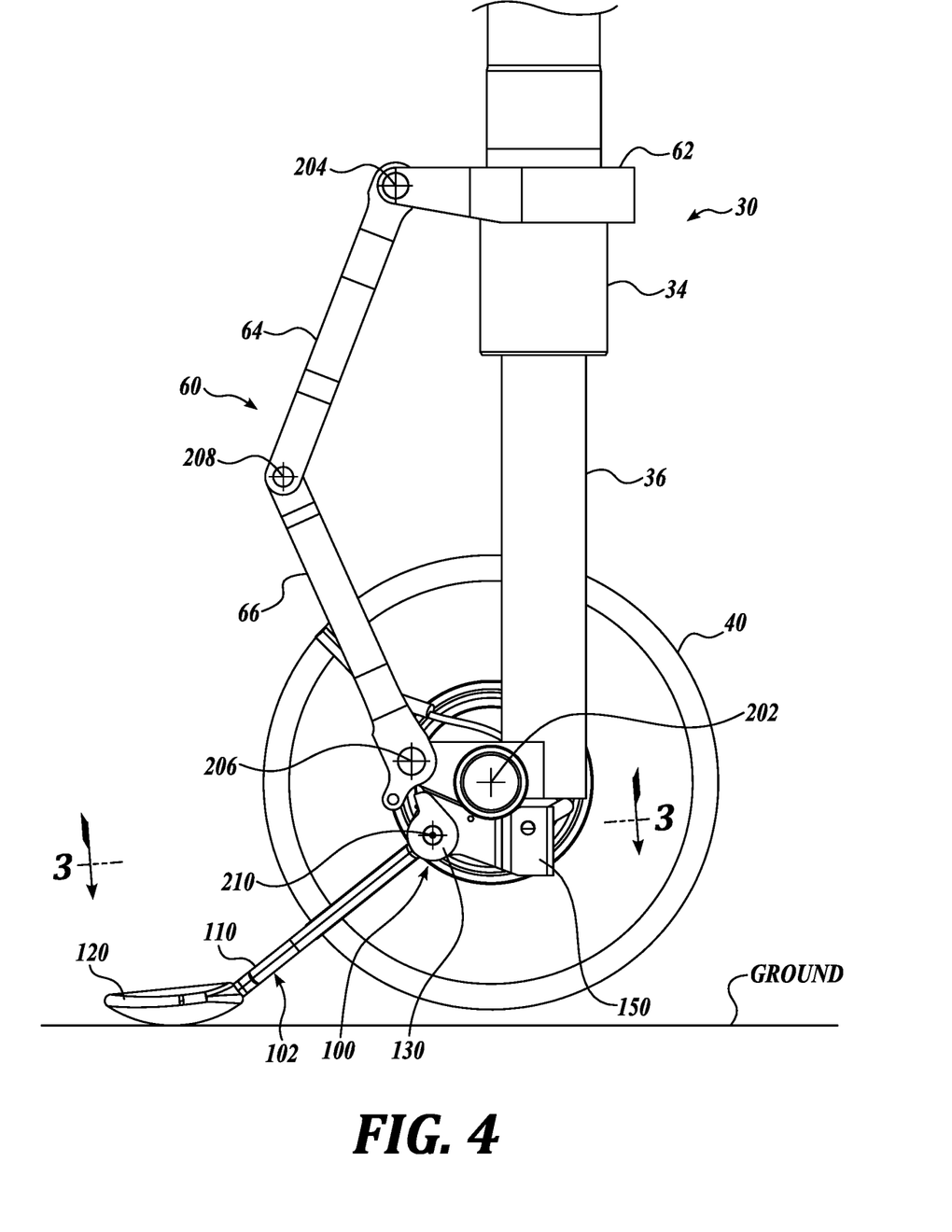
FIG. 4 shows a side view of the landing gear assembly of FIG. 1, wherein a landing gear probe is in a default position and in contact with the ground, and a shock strut is uncompressed.
Figure 8:
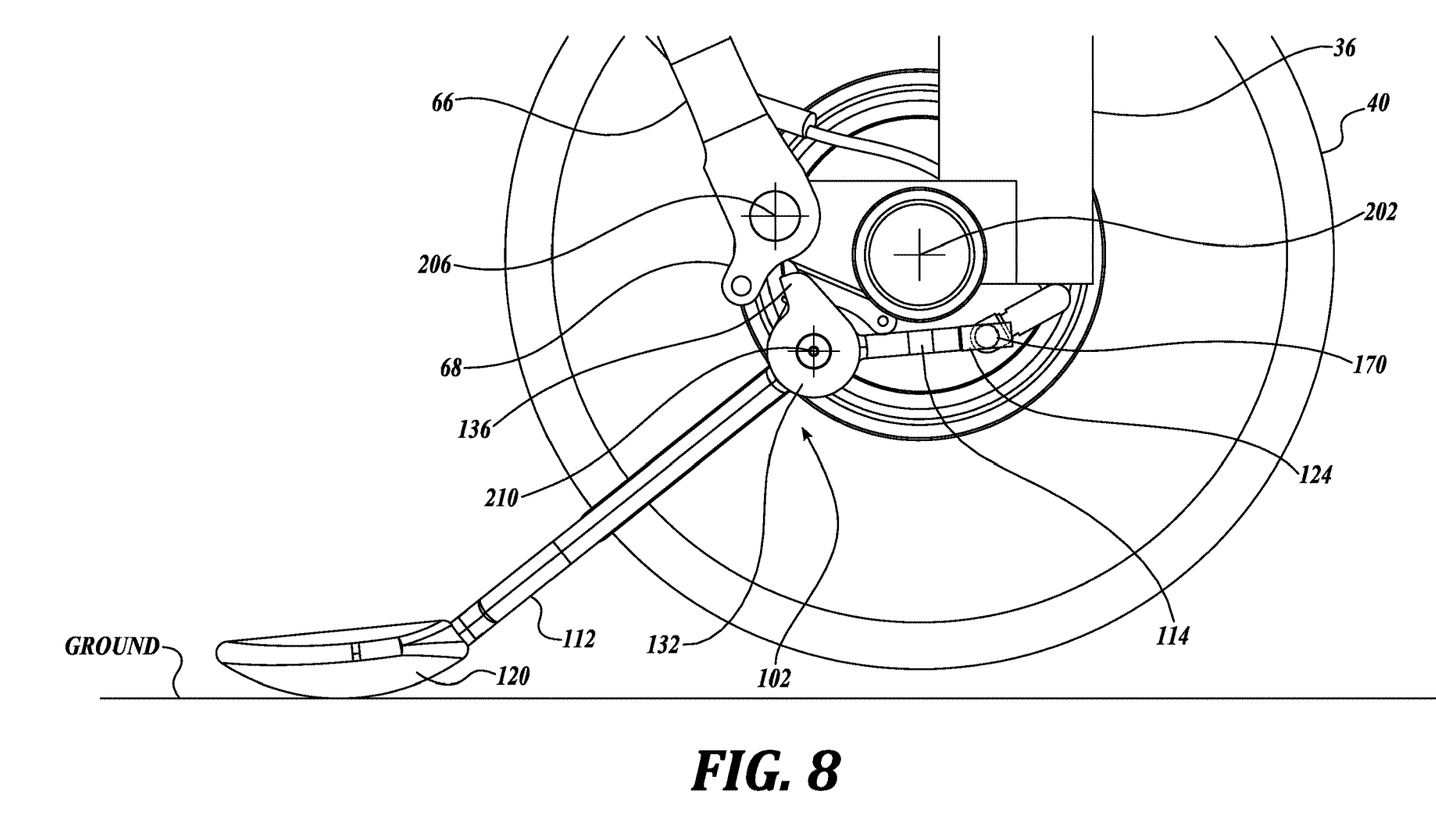
FIG. 8 is a partial side view of the landing as shown in FIG. 4.

FIGS. 4 and 8 show a side view of the landing gear 30 and corresponding position of the load detection system 100 when the wheels 40 have not contacted the ground, and the pad 120 of the probe 110 has contacted the ground but has not been rotated by contact with the ground. That is, the probe 110 is in the default position described above. As shown in FIG. 8, when the probe 110 is in the default position, the target 124 is aligned with the sensor 170.

Figure 5:
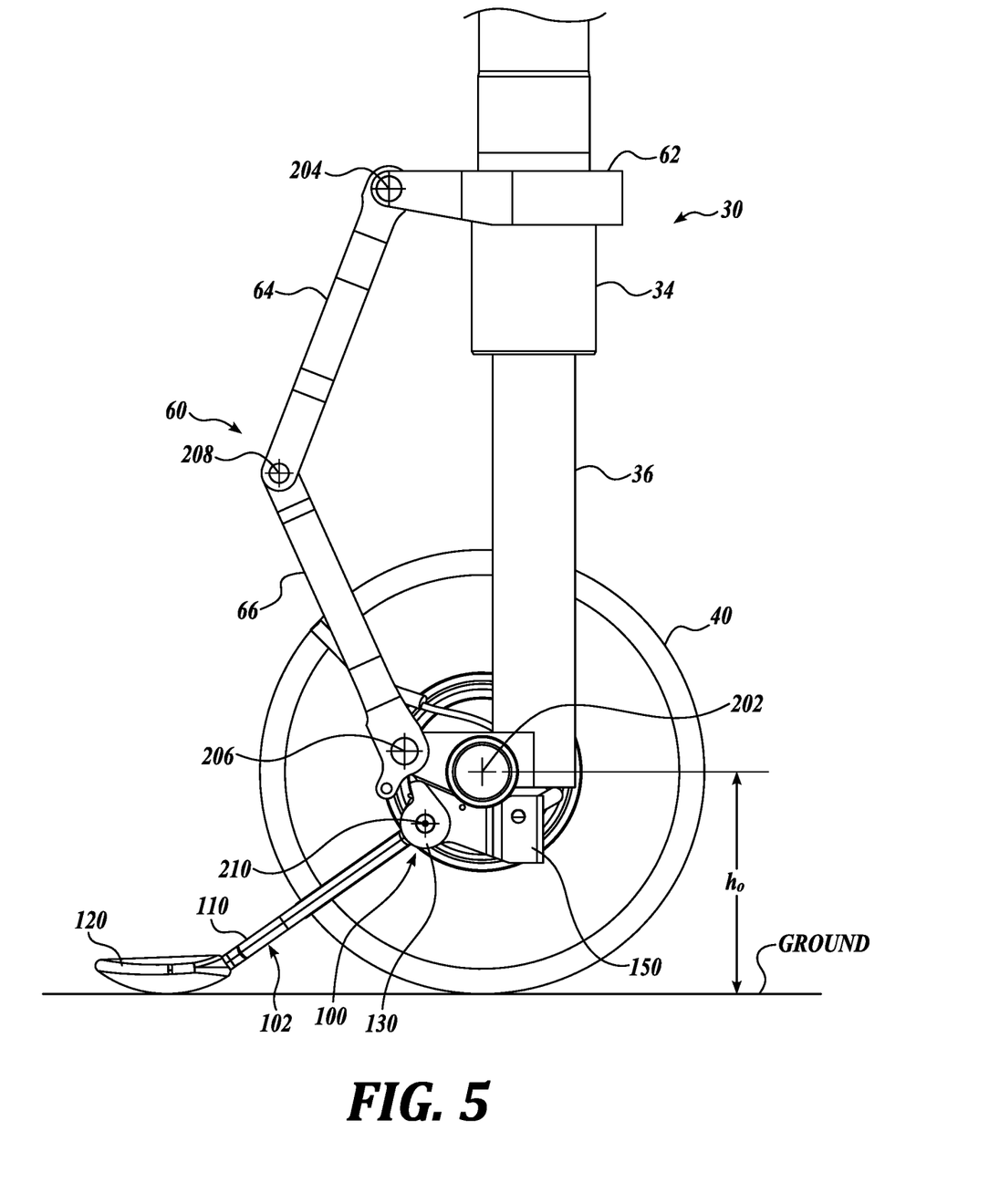
FIG. 5 shows a side view thereof, wherein the landing gear tires have contacted the ground and are undeflected.
Figure 9:
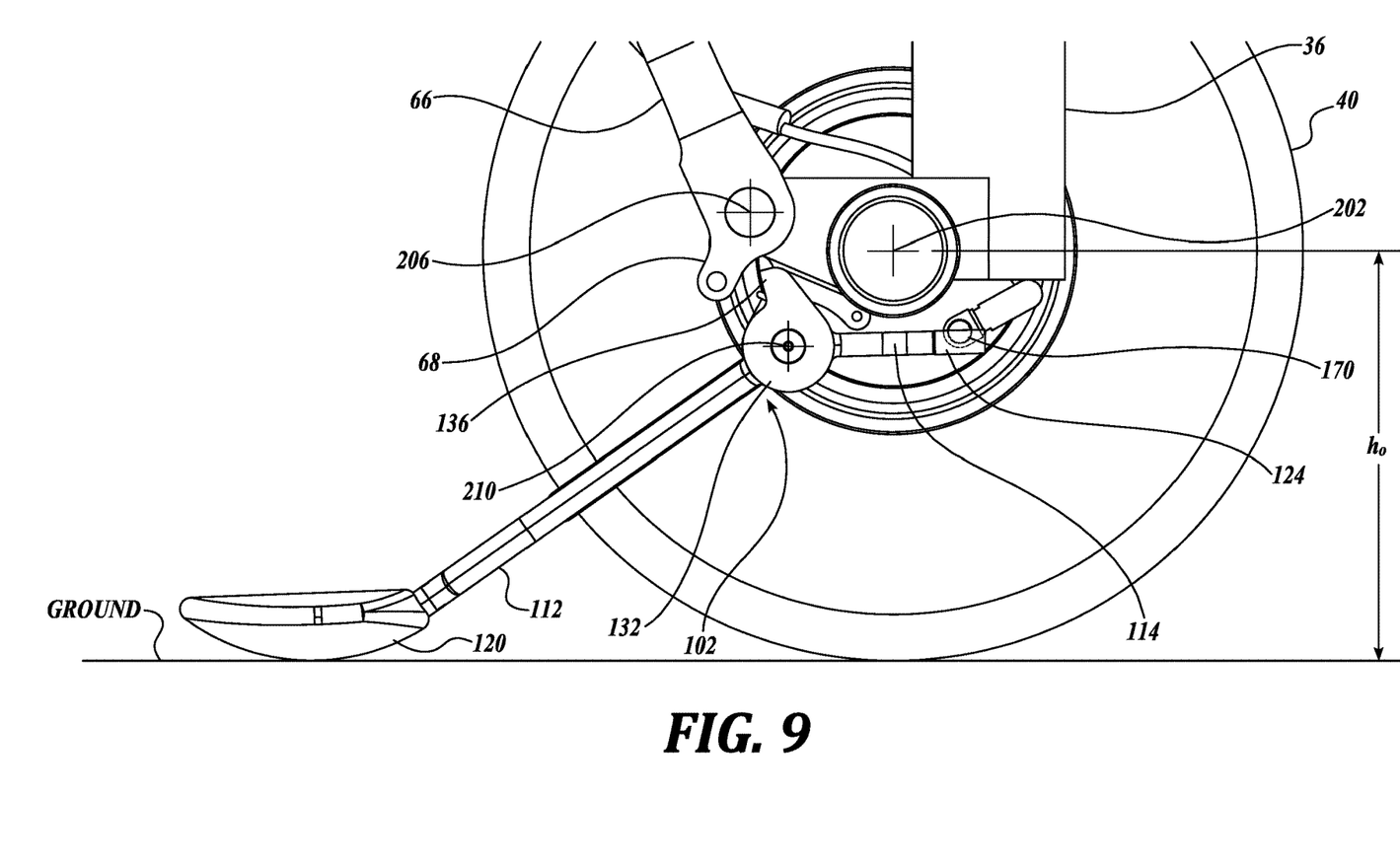
FIG. 9 is a partial side view of the landing as shown in FIG. 5.

In FIGS. 5 and 9, the aircraft 20 has continued to descend, and the wheels 40 have made initial contact with the ground but have not yet started to deflect under the weight of the aircraft 20. Accordingly, the distance $h_o$ from the centerline 202 of the wheels 40/axle assembly 38 to the ground is equal to the radius of the undeflected wheels 40. As the landing gear 30 moves from the position shown in FIGS. 4 and 8 to the position shown in FIGS. 5 and 9, the ground drives the pad 120 upward, which rotates the probe 110 (clockwise as viewed in FIGS. 5 and 9). As a result, the target 124 moves downward relative to the sensor 170.

Figure 6:
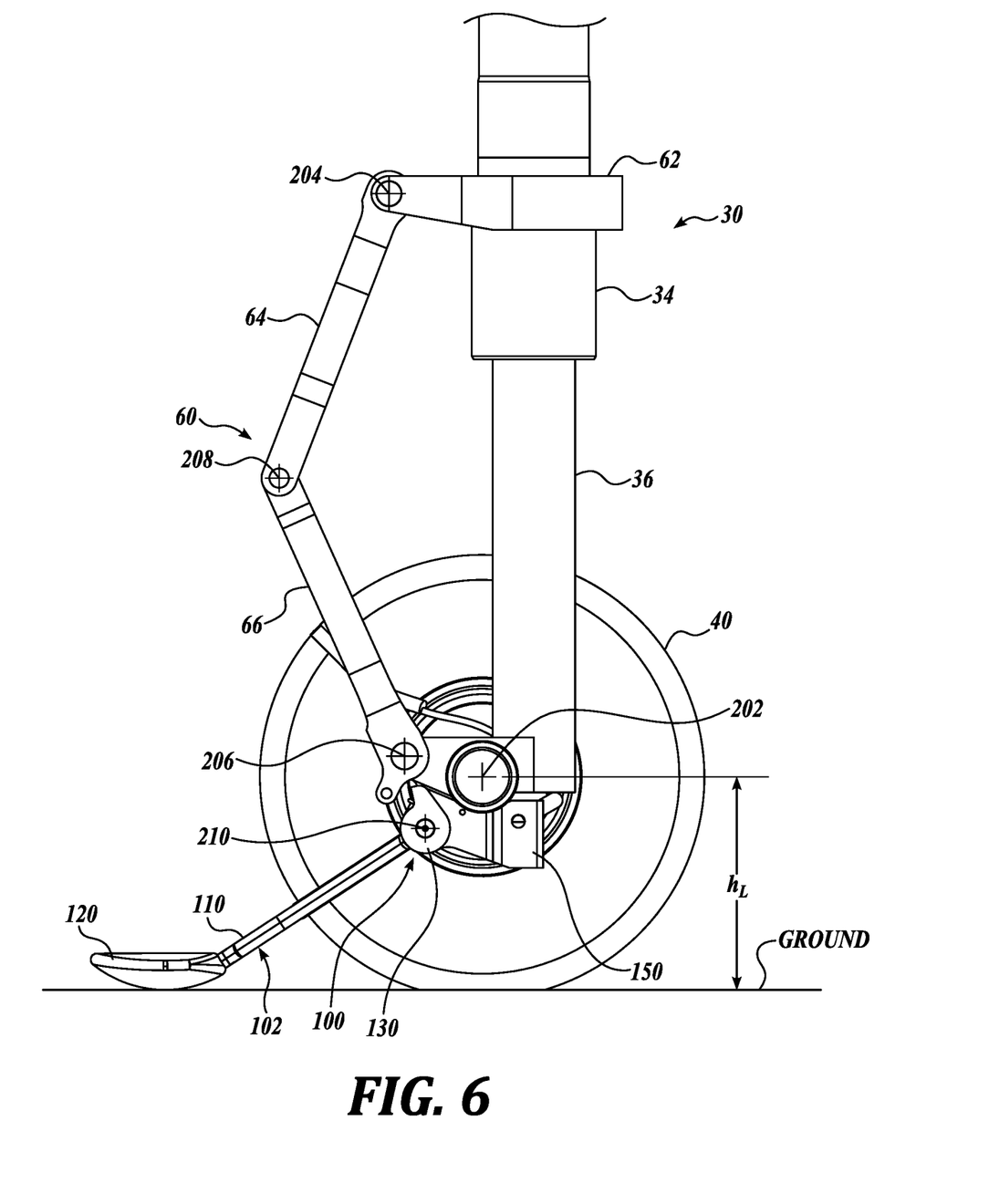
FIG. 6 shows a side view thereof, wherein the landing gear tires have contacted the ground and are at least partially deflected.
Figure 10:
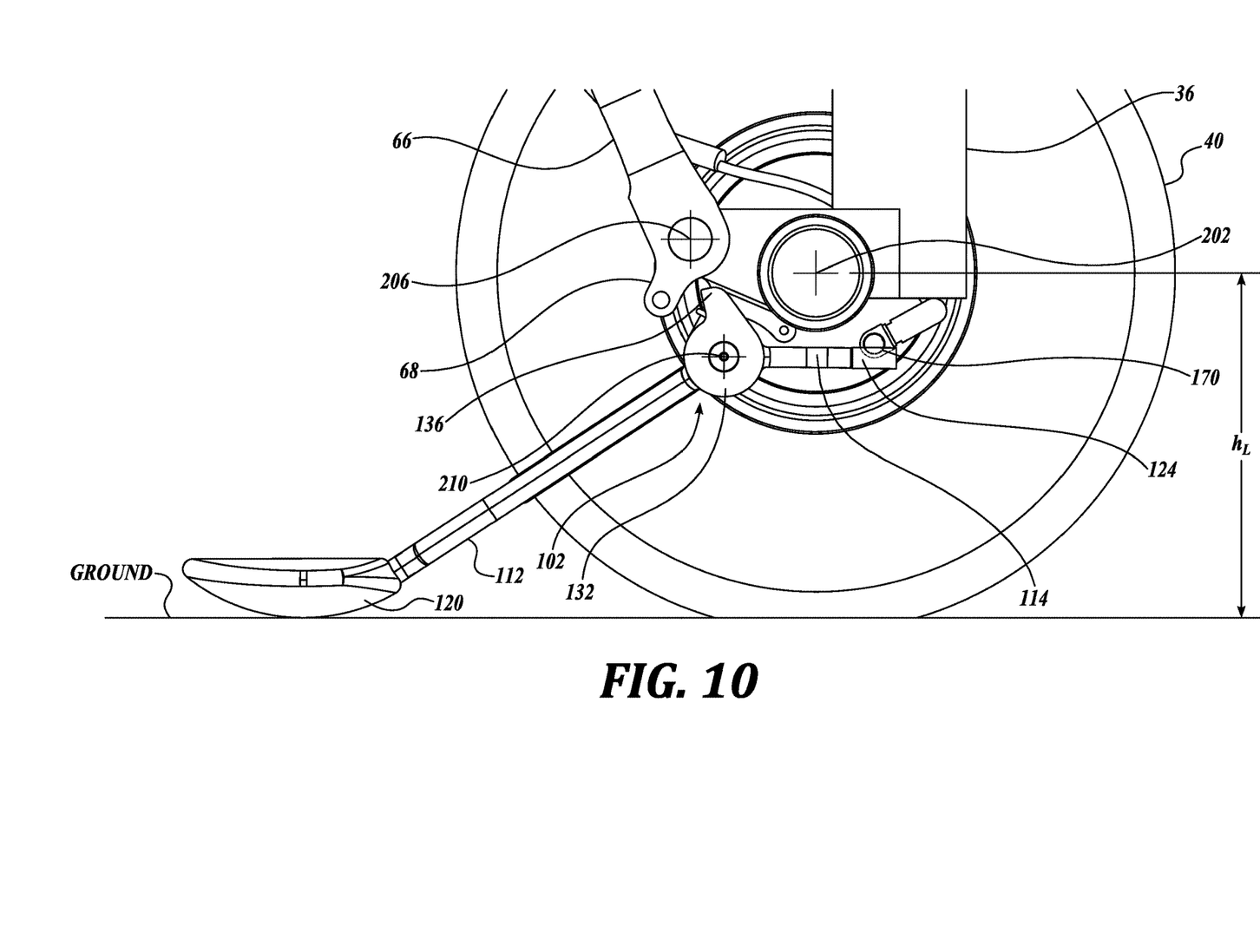
FIG. 10 is a partial side view of the landing as shown in FIG. 6.

In FIGS. 6 and 10, the aircraft has further descended to the point where a load (L) is applied to the landing gear 30. The load (L) is sufficient to deflect the wheels 40, or more specifically, the pneumatic tires of the wheels, but is less than the break-out load. Accordingly, the load (L) deflects the wheels 4 but is insufficient to compress the shock strut 32. In this regard, the load (L) deflects the wheels 40 so that distance between the centerline 202 of the wheels 40/axle assembly 38 and the ground is reduced from the distance $h_0$ to the distance $h_L$.

Deflection of the wheels 40 that reduces $h_0$ to the $h_L$ also lowers the axis of rotation 210 of the probe by a distance ($h_0$-$h_L$). As the axis of rotation 210 is lowered, the ground surface drives rotation of the probe 110 in a clockwise direction (as viewed in FIGS. 6 and 10) by a corresponding amount. Rotation of the probe 110 in turn moves the position of the target 124 relative to the sensor 170.

Because the physical characteristics of the wheels 40 are known, the deflection caused by a particular load can be determined. Further, for a given wheel deflection, the geometry of the probe assembly 102 allows for the position of the target 124 relative to the sensor 170 to be determined. Thus, a given load causes a corresponding wheel deflection, which in turn results in a predictable target 124 position relative to the sensor 170.

In some embodiments, the sensor 170 is a position sensor that determines the distance from the target 124 to the sensor 170 and sends a corresponding signal to the controller 180. In some embodiments, the sensor 170 is a "pass-by" sensor that sends a signal to the controller 180 when the target passes by the sensor 170, which occurs as the load reaches and then exceeds a predetermined load. In some embodiments, the sensor is a Rotational Variable Differential Transformer (RVDT) that measures the rotation angle of the probe 110 and sends a signal to the controller 180 corresponding to the measured rotational angle of the probe 110. In some embodiments, the RVDT sends continual signals to the controller 180 according to the measured angle, and the controller 180 determines the corresponding load so that the load detection system 100 continuously monitors the load on the landing gear 30. In some embodiments, the sensor 170 is any suitable sensor that sends a signal to the controller 180 that is used to determine a load on the landing gear 30.

Once on the ground, the aircraft 20 will often taxi, i.e., move, in various directions. Under such circumstances, continuous contact of the probe 110 with the ground surface would cause undesirable wear on the pad 120. This wear would increase maintenance costs and also affect the accuracy of the load detection system 100. Embodiments of the disclosed load detection system 100 avoid undue wear of the probe 110 and, in particular, the pad 120, by rotating the probe 110 so that the pad 120 disengages the ground surface when the break-out load is exceeded.

Figure 7:
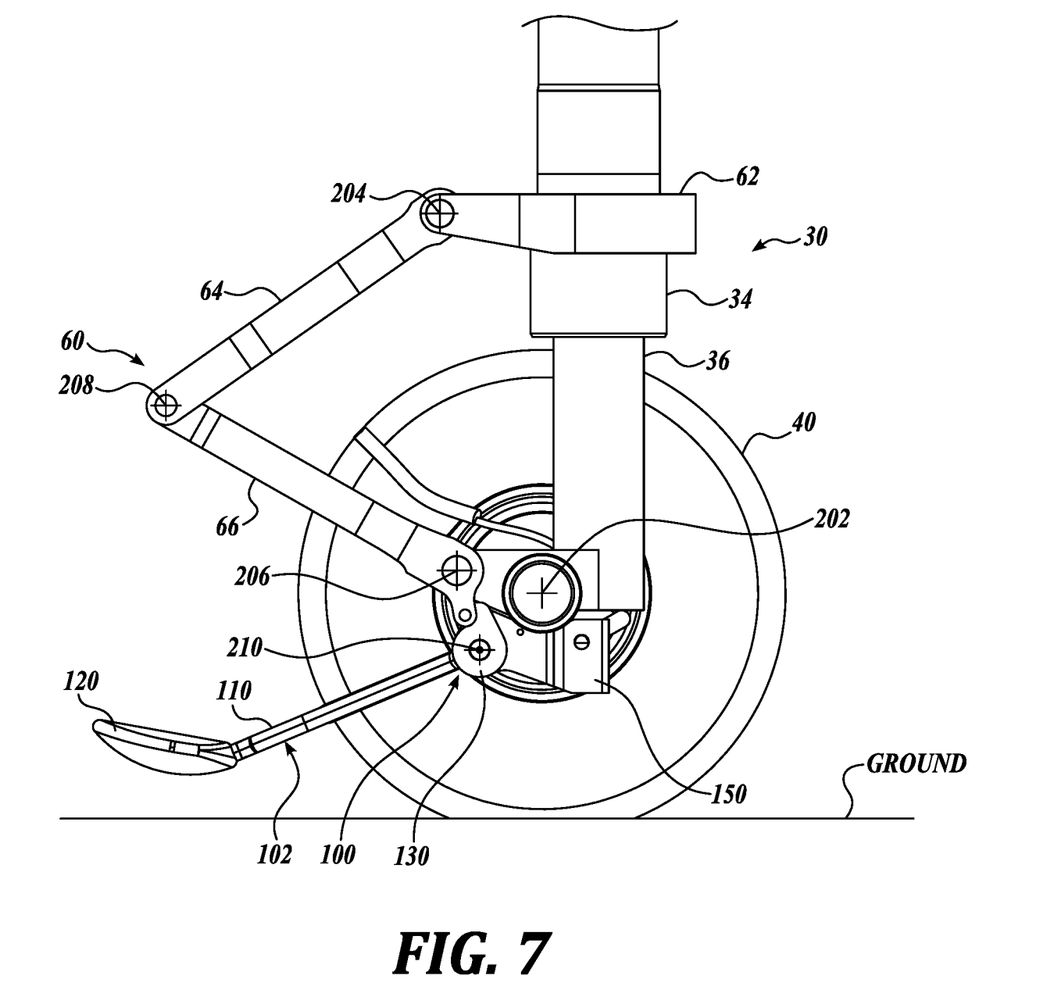
FIG. 7 shows a side view thereof, wherein the shock strut is at least partially compressed.
Figure 11:
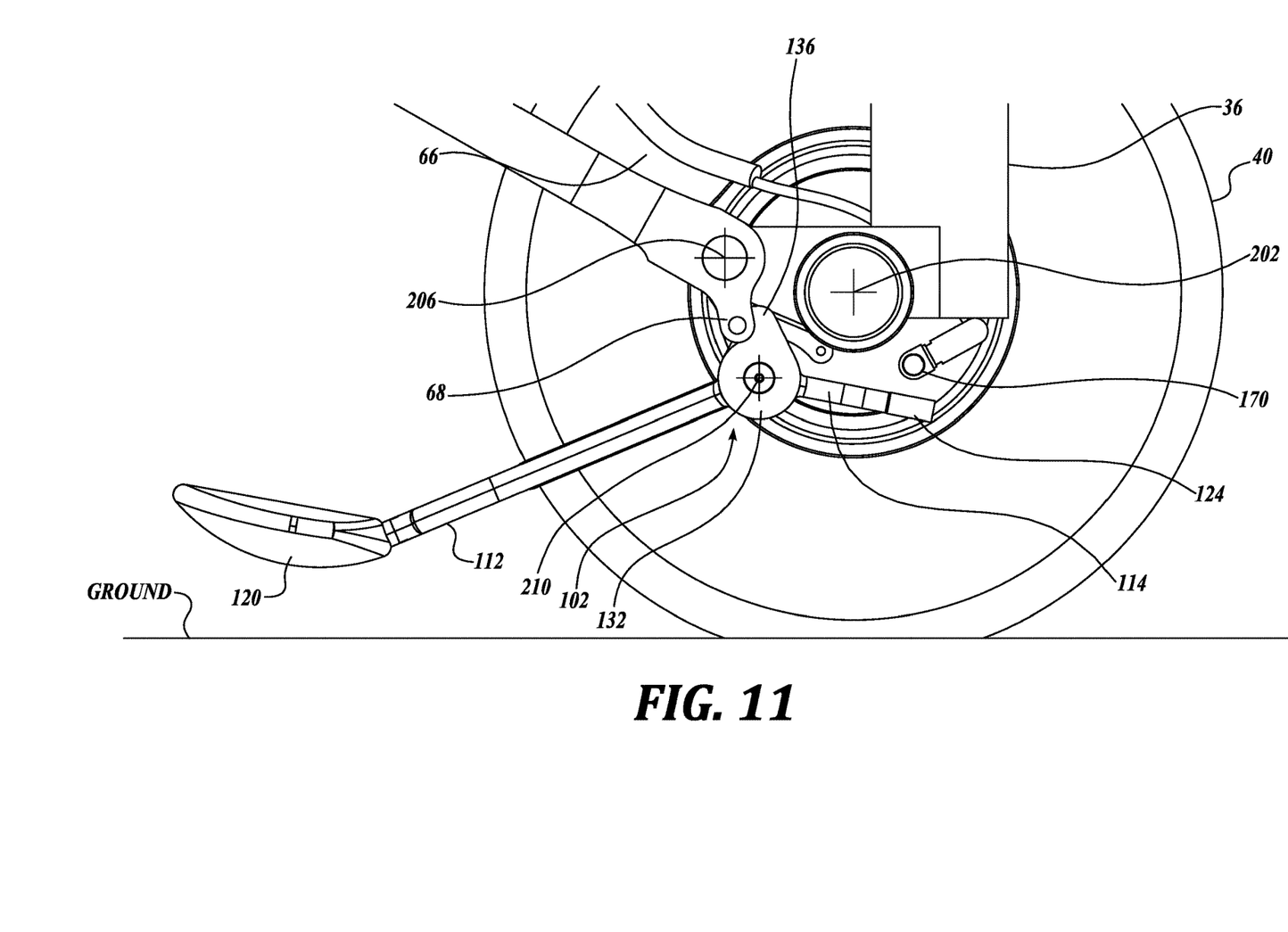
FIG. 11 is a partial side view of the landing as shown in FIG. 7.

Referring now to FIGS. 7 and 11, as the load on the landing gear 30 exceeds the break-out load, the shock strut 32 begins to compress. The compression of the shock strut 32 causes a scissoring motion of the torque link assembly 60 such that the upper link 64 and lower link 66 rotate relative to each other about axis 208.

The scissoring motion of the torque link assembly 60 also rotates the lower link 66 about axis 206. More specifically, the compression of the shock strut 32 rotates the lower link 66 in a counterclockwise direction (as shown in FIGS. 7 and 11) about axis 206. As the lower link 66 rotates about axis 206, an engagement feature 68, such as a lobe, formed on the lower link 66 engages the engagement feature 136, such as a lobe, formed on the pivot fitting 130. With the engagement feature 68 of the lower link 66 engaging the engagement feature 136 of the pivot fitting 130, further rotation of the lower link 66 about axis 206 in a counterclockwise direction (as shown in FIGS. 7 and 11) drives rotation of the probe 110 in a clockwise direction, thereby disengaging the pad 120 with the ground surface. In this manner, wear on the pad 120 during ground maneuvers is reduced. When the aircraft 20 takes off again, the shock strut 32 extends to its uncompressed state, and the biasing elements 156 return the probe to the default position of FIGS. 5 and 8.

Certain embodiments disclosed herein utilize circuitry (e.g., one or more circuits) in order to implement standards, protocols, methodologies or technologies disclosed herein, operably couple two or more components, generate information, process information, analyze information, filter signals, generate signals, encode/decode signals, convert signals, transmit and/or receive signals, control other devices, etc. Circuitry of any type can be used. It will be appreciated that the term "information" can be use synonymously with the term "signals" in this paragraph.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor that require software, firmware, and the like for operation. In an embodiment, circuitry includes one or more processors or portions thereof and accompanying software, firmware, hardware, and the like.

In some examples, the functionality described herein can be implemented by special purpose hardware-based computer systems or circuits, etc., or combinations of special purpose hardware and computer instructions.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A landing gear assembly, comprising:
   an axle coupled to a piston rod of a compressible shock strut, a wheel rotatably mounted the axle about a first axis, and a torque link with a lower link that is rotatable about a second axis that is parallel to the first axis, wherein movement of the shock strut from an uncompressed state to a compressed state rotates the lower link about the second axis in a first direction, and movement of the shock strut from the compressed state to the uncompressed state rotates the lower link about the second axis in a second direction; and
   a load detection system comprising:
      a probe assembly having an elongate probe rotatably coupled about a third axis that is parallel to the second axis, the elongate probe being configured to engage a ground surface when the shock strut is in an uncompressed state and the wheel is in contact with the ground surface, wherein rotation of the lower link in the first direction about the second axis engages the lower link with the probe assembly and drives rotation of the elongate probe about the third axis, and rotation of the lower link in the second direction about the second axis disengages the lower link from the probe assembly; and
      a sensor configured to sense a position of the probe, wherein the sensed position of the probe corresponds to a load on the wheel when the shock strut is uncompressed and the wheel is in contact with the ground surface.

2. The landing gear assembly of claim 1, wherein rotation of the probe by the lower link disengages the probe from the ground surface.

3. The landing gear assembly of claim 1, the load detection system further comprising a target mounted to the probe, the sensor being fixedly positioned relative to the axle and configured to sense the target.

4. The landing gear assembly of claim 3, wherein the sensor senses a position of the target.

5. The landing gear assembly of claim 3, wherein the sensor senses a movement of the target through a predetermined position.

6. The landing gear assembly of claim 1, wherein the sensor is a rotational variable differential transformer configured to sense an angular position of the probe.

7. The landing gear assembly of claim 1, the load detection system further comprising:
   a mounting fitting coupled to the axle; and
   a pivot fitting rotatably coupling the probe to the mounting fitting.

8. The landing gear assembly of claim 7, wherein the pivot fitting is fixed in rotation relative to the probe about the third axis.

9. The landing gear assembly of claim 8, wherein the lower link comprises a link engagement feature that contacts a pivot fitting engagement feature as the shock strut moves from the uncompressed state to a compressed state.

10. The landing gear assembly of claim 9, wherein at least one of the link engagement feature and the pivot fitting engagement feature is formed on the lower link and the pivot fitting, respectively.

11. The landing gear assembly of claim 1, wherein the sensor is configured to send signals corresponding to a sensed probe position to a controller, the controller being programmed to determine a load applied to the landing gear according to signals received from the sensor.

12. The landing gear assembly of claim 1, wherein the probe rotates in response to deflection of the wheel when the shock strut is uncompressed.

13. The landing gear assembly of claim 1, wherein the probe comprises a pad that contacts the ground surface.

14. The landing gear assembly of claim 13, wherein a position of the pad relative to the third axis is selectively adjustable.

* * * * *